United States Patent [19]
Noomen et al.

[11] Patent Number: 5,852,094
[45] Date of Patent: *Dec. 22, 1998

[54] MOISTURE CURING COATING COMPOSITION

[75] Inventors: Arie Noomen, Voorhout; Petrus Johannes Maria van Kesteren, Sassenheim; Nicolaas Antonius Maria Schoonderwoerd, Stompwijk, all of Netherlands

[73] Assignee: Akzo Nobel NV, Arnhem, Netherlands

[ * ] Notice: This patent issued on a continued prosecution application filed under 37 CFR 1.53(d), and is subject to the twenty year patent term provisions of 35 U.S.C. 154(a)(2).

[21] Appl. No.: 755,383

[22] Filed: Nov. 21, 1996

[30] Foreign Application Priority Data

Nov. 22, 1995 [NL] Netherlands ............................ 1001716

[51] Int. Cl.$^6$ ...................................................... C08K 3/22
[52] U.S. Cl. ........................................... 524/433; 524/555
[58] Field of Search ...................................... 524/433, 555

[56] References Cited

U.S. PATENT DOCUMENTS

| | | | |
|---|---|---|---|
| 4,018,826 | 4/1977 | Gless | 525/351 |
| 4,167,422 | 9/1979 | Bellanca | 523/100 |
| 4,176,136 | 11/1979 | Brenzel | 260/561 |
| 4,323,489 | 4/1982 | Beers | 528/18 |
| 4,408,018 | 10/1983 | Bartman et al. | 525/300 |
| 4,871,822 | 10/1989 | Brindopke et al. | 526/271 |
| 5,084,536 | 1/1992 | Brindopke et al. | 526/218.1 |
| 5,424,365 | 6/1995 | Elmore et al. | 525/208 |
| 5,454,861 | 10/1995 | Hasegawa et al. | 106/2 |

FOREIGN PATENT DOCUMENTS

| | | | |
|---|---|---|---|
| 0 160 824 | 11/1985 | European Pat. Off. | C08F 299/02 |
| 0 161 697 | 11/1985 | European Pat. Off. | C09D 3/48 |
| 0 199 087 | 10/1986 | European Pat. Off. | C08F 8/32 |
| 0 227 454 | 7/1987 | European Pat. Off. | C08F 8/00 |
| 0 326 723 | 8/1989 | European Pat. Off. | C08F 8/32 |
| 0 454 271 | 10/1991 | European Pat. Off. | C09D 163/00 |
| 0 483 974 | 5/1992 | European Pat. Off. | C09D 133/06 |
| 1 407 002 | 9/1975 | United Kingdom | C08G 59/02 |
| 2 235 928 | 3/1991 | United Kingdom | C09D 5/00 |
| WO 91/09910 | 7/1991 | WIPO | C08L 67/07 |

OTHER PUBLICATIONS

*Netherlands Search Report* dated Aug. 8, 1996 in NL 1001716.

Carder et al., "Polyenamine Coatings II. Chemical Methods of Improving Film Properties," vol. 46, *Journal of Paint Technology*, 76–81 (Apr. 1974).

Grawe et al., "Chelation As a Means of Developing Crosslinking Emulsions," vol. 52, *Journal of Coatings Technology*, 73–87 (Feb. 1980).

Hoy et al., "Polyenamine Coatings I. Formulation of Coatings and Determination of Film Properties," vol. 46, *Journal of Paint Technology*, 70–75 (Apr. 1974).

*Primary Examiner*—Paul R. Michl
*Attorney, Agent, or Firm*—Loretta A. Miraglia; Dilworth & Barrese

[57] ABSTRACT

Described is a coating composition comprising an organic compound comprising at least two acetoacetate groups or acetamide groups or a combination of these two groups and the oxide of a metal of Group IIa of the Periodic Table. The metal preferably is calcium or magnesium. The composition may further comprise a compound comprising at least two $\alpha,\beta$-ethylenically unsaturated groups and, optionally, a catalyst for the reaction of the acetoacetate groups and/or acetamide groups with the $\alpha,\beta$-ethylenically unsaturated groups.

24 Claims, No Drawings

MOISTURE CURING COATING COMPOSITION

The invention pertains to a coating composition comprising a metal compound and an organic compound comprising at least two acetoacetate groups or acetamide groups or a combination of the two groups.

BACKGROUND OF THE INVENTION

From GB patent specification No. 1 407 002 a composition is known where, int. al., the formation of chelates from acetoacetate-functional epoxy resins and alcoholates of metals, e.g., calcium alcoholate, is described. However, the presence of water is excluded here because it would cause metal hydroxides to form, so preventing chelation from taking place. Any water of crystallisation that may be present in the compounds used is removed by heating them. In other words, there must be no water present at the curing. An additional drawback is the release of alcohols when curing.

The *Journal of Coatings Technology*, Vol. 52, No. 661 (February 1980) on pp. 73–87 describes chelation as a means of crosslinking emulsions. The emulsion of an acetoacetate functional compound is chelated using, int. al., calcium chloride and magnesium chloride, preference being given to the use of zinc chloride and zinc acetate. Said article relates to a system based on water or dimethyl formamide. The systems described, however, have long curing times, and in addition the salts may have a negative effect on the water resistance of the final film. Furthermore, water based systems have the disadvantage that acetoacetate-functional compounds have limited hydrolysis stability, which means that reactivity is largely lost during storage.

The invention has for its object to provide a coating composition without the aforementioned drawbacks and of which the other properties are also satisfactory.

SUMMARY OF THE INVENTION

The coating composition is characterised in that the metal compound is the oxide of a metal of Group IIa of the Periodic Table.

Surprisingly, it has been found that a coating composition comprising an organic compound comprising at least two acetoacetate groups or acetamide groups or a combination of the two groups cures very rapidly in the presence of the oxide of a metal of Group IIa of the Periodic Table.

Especially suitable metals of Group IIa of the Periodic Table in this connection are magnesium and calcium.

GB-A-2 235 928 describes a powdered road marking composition consisting of an organic binder with calcium oxide added thereto, to which water has to be added just prior to application. The addition of the water sets off an exothermic reaction, causing the binder to melt and rendering the composition processable. No mention is made of an acetoacetate- or acetamide-functional compound.

According to the invention, at least two acetoacetate groups or acetamide groups or a combination of such groups are present per organic compound. An "organic compound" is herewith defined as a hydrocarbon compound containing no metal atoms. The organic compound may be a monomer or polymer. The polymeric compound has preferably a Mn above 450, more preferably between 500 and 5000, most preferably between 500 and 2000.

DETAILED DESCRIPTION OF THE INVENTION

Organic compounds containing acetoacetate groups can be synthesised by reacting polyhydroxyl-functional compounds with diketene, e.g., as described in K. L. Hoy and C. H. Carder, "Polyenamine Coatings I. Formulation of Coatings and Determination of Film Properties," *Journal of Paint Technology*, Vol. 46, No. 591 (April 1974), 70–75. Also suitable are acetoacetate-functional organic polymers derived therefrom, such as disclosed, int. al., in C. H. Carder and H. O. Colomb, Jr., "Polyenamine Coatings II. Chemical Methods of Improving Film Properties," *Journal of Paint Technology*, Vol. 46, No. 591 (April 1974), 76–81.

Also suitable are acetoacetate-functional organic compounds obtained by copolymerising acetoacetate-functional monomers with unsaturated monomers as described, e.g., in EP-B-0 199 087 and in WO 91/09910. Suitable are, int. al., the reaction products of acetoacetoxyethyl methacrylate and one or more alkyl(meth)acrylates, hydroxy-functional alkyl (meth)acrylates, epoxy-functional alkyl(meth)acrylates, and, optionally, other α,β-ethylenically unsaturated compounds. In this connection mention may be made of butyl (meth)acrylate, methyl(meth)acrylate, hydroxyethyl(meth) acrylate, glycidyl(meth)acrylate, and styrene.

Further, it is possible to employ acetoacetate-functional organic compounds prepared by transesterifying polyhydroxyl-functional monomers or polymers with acetoacetate-functional esters, as described, e.g., in EP-A-0 227 454. Suitable organic compounds in this connection are dipropylene glycol diacetoacetate, 1,6-hexane diol diacetoacetate, and 1,5-pentane diol diacetoacetate. The transesterification product of pentaerythritol and acetoacetate esters is suitable also.

Instead of or in addition to at least two acetoacetate-functional organic compounds, organic compounds can be used which comprise at least two acetamide groups or combinations of such groups. Examples of organic compounds comprising acetamide groups are those built up from the reaction products of diketene and ethanol amine:

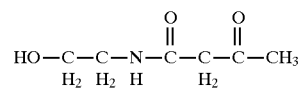

or a compound of the following structure:

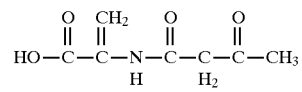

The molar ratio of said acetoacetate groups and/or acetamide groups to metal oxide has to be about 1 to about 0.5 to 10, preferably 1 mole of acetoacetate groups and/or acetamide groups to 0.5 to 7 moles of metal oxide.

In addition to the aforementioned acetoacetate- and/or acetamide-functional organic compounds, the coating composition, if so desired, may comprise mono-acetoacetate- or mono-acetamide-functional organic monomers as reactive thinners, e.g., ethyl acetoacetate, tertiary butyl acetoacetate or acetyl acetone. Also, oligomers and polymers which do not contain any acetoacetate groups or acetamide groups may be present as, for example, adhesion promoters or polymeric softening agents, e.g., hydroxyl-functional polyesters, epoxy resins, alkoxy silanes, and polyisocyanates. Amines which may be blocked or not, e.g., (poly)ketimines, can also be added. This is described, int. al., in K. L. Hoy and C. H. Carder, "Polyenamine Coatings I. Formulation of Coatings and Determination of Film Properties," *Journal of Paint Technology*, Vol. 46, No. 591 (April 1974), 70–75.

Preferably, however, compounds are present which comprise at least two α,β-ethylenically unsaturated groups, e.g., as described in EP-A-0 161 697. In general, acryloyl-functional compounds are satisfactory. Especially suitable are, e.g., the reaction products of hexamethoxymethyl melamine and 3, 4, or 5 moles of hydroxybutyl acrylate (which last compound is commercially available from Akcros Chemicals, Manchester, England, under the trade name "SETACURE™" 590), hexamethoxymethyl melamine with 2.5 or 5 moles of a reaction product of 2 moles of caprolactone and 1 mole of hydroxyethyl acrylate (which last compound is commercially available from Akcros Chemicals under the trade name "SETACURE™" 591), propoxylated glycerol triacrylate, ethoxylated trimethylol triacrylate, and aromatic urethane diacrylate (commercially available from Akcros Chemicals under the trade names "ACTILANE®" 432 and 432 and 430 and "SETACURE™" 567, respectively).

The molar ratio of acetoacetate groups and/or acetamide groups to α,β-ethylenically ethylenically unsaturated groups is about 1 mole to about 0.5 to 2, preferably 1 mole of acetoacetate groups and/or acetamide groups to 0.8 to 1.5 moles of α,β-ethylenically unsaturated groups.

In compositions comprising compounds with at least two α,β-ethylenically unsaturated groups optionally one or more strong bases may be present as catalysts for the reaction between the α,β-ethylenically unsaturated groups and the acetoacetate groups and/or acetamide groups. Highly satisfactory results have been obtained in this connection using diazabicycloundecene, diazabicyclononene, tetramethyl guanidine, tetramethyl ammonium hydroxide or diazabicyclooctane (DABCO). Alternatively, instead of or in addition to said strong bases other catalysts may be present for the reaction of the acetoacetate groups or acetamide groups with the α,β-ethylenically unsaturated groups, e.g., epoxy compounds which in combination with DABCO yield strong bases. These and other catalysts are described in EP-A-0 160 824. Also satisfactory is a mixture of possible catalysts such as described in EP-A-0 326 723. Further, it is possible to employ onium salts, such as phosphonium and ammonium, as well as, say, phosphines as catalysts. An amount of about 1–10 wt. % of catalyst is to be used, calculated on the acetoacetate- and/or acetamide-functional organic compounds and the compounds comprising at least two α,β-ethylenically unsaturated groups. The use of 2–6 wt. % of catalyst is preferred.

The reaction of the acetoacetate groups and/or acetamide groups with the α,β-ethylenically unsaturated groups proceeds alongside the reaction of the acetoacetate groups and/or acetamide groups with the metal oxide. The former reaction provides the final coat with a higher flexibility. The reaction of the acetoacetate groups and/or acetamide groups with the metal oxide will generally proceed more rapidly than that of the acetoacetate groups and/or acetamide groups with the α,β-ethylenically unsaturated groups.

In addition to the compounds already mentioned, the coating composition may comprise the usual coating composition compounds, such as rheology improvement agents, fillers such as talcum and barium sulphate, pigments such as titanium dioxide, as well as, optionally, moisture scavengers.

The water required for rapid curing can be added just before the application of the coating composition. At most, 1 mole of water may be added per mole of metal oxide. However, in many cases the moisture which is present in pigments or fillers, or the moisture from the air with which the composition comes into contact after being applied, will be sufficient for curing the composition. Highly practical in this connection is a system made up of two compositions. Composition A will comprise, say, the acetoacetate- and/or acetamide-functional organic compound and any present solvents, reactive thinners, and other compounds already described. Composition B will comprise, say, the metal oxide, pigments, and fillers, optionally together with the earlier described compounds comprising at least two α,β-ethylenically unsaturated groups. The presence of water of crystallisation, if any, in composition B does not have any adverse effects on the reactivity of the two-component system. These two compositions can be combined prior to the processing of the coating composition. If so desired, a small amount of water may be added.

Alternatively, if so desired, the metal oxide may be added to a composition comprising all the components already disclosed prior to application. In that case, preferably use is made of metal oxide powder having particles smaller than about 100 microns.

The coating composition can be applied in any desired manner, e.g., by brushing, spraying, roller coating, flow coating, and using a filling knife.

The coating composition of the present invention may be applied to any substrate, for example, metal, plastic, wood, or glass. Because of its rapid drying, the coating composition is highly suited to be used when the application of thick layers is required. A particular case in point is putty, especially in automotive repair work, i.e., refinishing motor vehicles and transportation vehicles and finishing large transportation vehicles such as trains, trucks, buses, and aeroplanes.

EXAMPLE 1

To an acetoacetate-functional organic compound (binder A) were added 30 parts by weight (pbw) of calcium oxide. Next, a small amount of water was added and the curing time was measured.

Employed as acetoacetate-functional binder A was the transesterification product of pentaerythritol and ethyl acetoacetate, which was prepared as follows.

In a reaction vessel equipped with a "DESTSTAR™" (from Normschliff Gerätebau of Wertheim, Germany) distillation set-up 340 g of pentaerythritol, 1460 g of ethyl acetoacetate, and 1000 ppm of dibutyl tin oxide were mixed and heated to reflux temperature, after which care was taken to ensure that the temperature did not exceed 170° C. On conclusion of the reaction the mixture was cooled and the residual ethyl acetoacetate was distilled off under high vacuum.

Table 1 below lists the drying times with and without the addition of a small amount of water. The amounts in Table 1 are in parts by weight.

TABLE 1

| Binder A | 100 | 100 |
| Calcium oxide | 30 | 30 |
| Water | 0 | 2 |
| Gelling time | >5 days | 5 min. |

EXAMPLE 2

Acetoacetate-functional binder B was an acrylate copolymer of butyl acrylate, styrene, and acetoacetoxyethyl methacrylate prepared in the following manner.

Into a reaction vessel 395.9 g of ethyl acetoacetate were introduced and heated to 160° C., with an inert gas being passed over. Over a period of 3 hours a mixture of 1691.3 g of acetoacetoxyethyl methacrylate, 708.5 g of butyl acrylate, 116.7 g of styrene, 253.1 g of tert-butylperoxy-3,3,5-trimethyl hexanoate ("TRIGONOX®" 42S from Akzo Nobel Chemicals bv, Amersfoort, The Netherlands), and 53.6 g of ethyl acetoacetate were added to the ethyl acetoacetate already present. The whole was then cooled to 140° C. Next, 12.7 g of "TRIGONOX®" 42S and 36.0 g of ethyl acetoacetate were added. After 30 minutes the same amounts of "TRIGONOX®" 42S and ethyl acetoacetate were added again, and then once more after another 30 minutes. Subsequently, flushing took place with 31.3 g of ethyl acetoacetate. After 30 minutes the reaction product was cooled and filtered. The resulting reaction product, binder B, had the following characteristics:

Tg=269K,

Mn=1285, Mw=3448,

78% solids, solvent: ethyl acetoacetate, the equivalent weight of the resin solution was 275 g/equiv. acetoacetate, viscosity: 2.5 Pas The next two formulations were prepared and evaluated. The amounts are parts by weight.

|  | Formulation 1 |  | Formulation 2 |
| --- | --- | --- | --- |
| composition A |  | composition A |  |
| Binder B | 19.98 | Binder B | 18.23 |
| DBU[3] | 2.10 | "EPIKOTE ®"828[1] | 3.56 |
| Titanium dioxide | 4.33 | Titanium dioxide | 4.22 |
| Talcum | 23.50 | Talcum | 22.94 |
| Barium sulphate | 4.53 | Barium sulphate | 4.39 |
| composition B |  | composition B |  |
| "SETACURE ™"590[2] | 18.92 | "SETACURE ™"590[2] | 17.27 |
| Calcium oxide | 16.30 | Calcium oxide | 14.88 |
| Titanium dioxide | 1.39 | Titanium dioxide | 1.66 |
| Talcum | 7.55 | Talcum | 9.02 |
| Barium sulphate | 1.44 | Barium sulphate | 1.72 |
|  |  | DABCO[4] | 2.13 |

[1] from Shell Chemical Corp., Houston, TX,
[2] from Akcros Chemicals, Manchester, England,
[3] DBU = diazabicycloundecene,
[4] DABCO = diazabicyclooctane After compositions A and B were mixed, the mixtures were applied to bare steel with a filling knife and evaluated. Resistance to water and to solvent was tested after 24 hours of ageing at room temperature. The results are listed in Table II.

TABLE II

|  | Curing time | Sandable after | Resistance to methyl ethyl ketone | Resistance to water |
| --- | --- | --- | --- | --- |
| Form. 1 | 5 min. | 20 min. | unimpaired after 10 min. | unimpaired after 7 hours |
| Form. 2 | 30 min. | 60 min. | unimpaired after 10 min. | unimpaired after 7 hours |

We claim:

1. A coating composition comprising a metal compound that is the oxide of a metal of Group IIa of the Periodic Table and an organic compound comprising at least two acetoacetate groups or acetamide groups of the formula

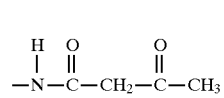

or a combination of the two groups.

2. The coating composition of claim 1 wherein the metal of Group IIa is calcium or magnesium.

3. The coating composition of claim 1 wherein the ratio of acetoacetate groups and/or acetamide groups to metal oxide is 1 to 0.5–10 moles.

4. The coating composition of claim 1 wherein the coating composition comprises a compound comprising at least two α,β-ethylenically unsaturated groups.

5. The coating composition of claim 4 wherein the compound comprising at least two α,β-ethylenically unsaturated groups is an acryloyl functional compound.

6. The coating composition of claim 5 wherein the acryloyl functional compound is a reaction product of hexamethoxymethyl melamine and a hydroxyl-functional acrylate.

7. The coating composition of claim 4 wherein the composition comprises a catalyst for the reaction of the acetoacetate groups and/or acetamide groups with the α,β-ethylenically unsaturated groups.

8. The coating composition of claim 7 wherein the catalyst is selected from the group consisting of diazabicyclononene, tetramethyl guanidine, tetramethyl ammonium hydroxide, and diazabicyclooctane in combination with one or more epoxy functional compounds.

9. The coating composition of claim 1 wherein the organic compound is a polymer having an Mn of at least 450.

10. The coating composition of claim 1 wherein the composition comprises a mono-acetoacetate- or mono-acetamide-functional organic monomer.

11. A process for coating a substrate with the coating composition of claim 1 wherein the coating composition is exposed to moisture from the air.

12. A process for coating a substrate with the coating composition of claim 1 comprising adding hydrous additives to the coating composition prior to its application.

13. A process for coating a substrate with the coating composition of claim 1 comprising adding water to the coating composition prior to its application.

14. A two-component filler comprising a composition A and a composition B, with composition A comprising an organic compound comprising at least two acetoacetate groups or acetamide groups or a combination of these groups and with composition B comprising the oxide of a metal of Group IIa of the Periodic Table.

15. The two-component filler of claim 14 wherein the metal is calcium or magnesium.

16. The two-component filler of claim 14 wherein composition B comprises a compound comprising at least two α,β-ethylenically unsaturated groups.

17. The two-component filler of claim 16 wherein the α,β-ethylenically unsaturated groups are acryloyl groups.

18. A coating composition comprising a metal compound that is the oxide of a metal of Group IIa of the Periodic Table a compound comprising at least two α,β-ethylenically unsaturated groups and an organic compound comprising at least two acetoacetate groups or acetamide groups of the formula

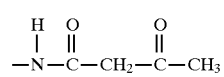

or a combination of the two groups.

19. The coating composition of claim 18 wherein the compound comprising at least two α,β-ethylenically unsaturated groups is an acryloyl functional compound.

20. The coating composition of claim 19 wherein the acryloyl functional compound is a reaction product of hexamethoxymethyl melamnine and a hydroxyl-functional acrylate.

21. The coating composition of claim 18 wherein the composition comprises a catalyst for the reaction of the acetoacetate groups and/or acetamide groups with the α,β-ethylenically unsaturated groups.

22. The coating composition of claim 21 wherein the catalyst is selected from the group consisting of diazabicycloundecene, diazabicyclononene, tetramethyl guanidine, tetramethyl ammonium hydroxide, and diazabicyclooctane in combination with one or more epoxy functional compounds.

23. A two-component filler comprising a composition A and a composition B, with composition A comprising an organic compound comprising at least two acetoacetate groups or acetamide groups of the formula

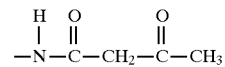

or a combination of these groups and with composition B comprising the oxide of a metal of Group IIa of the Periodic Table and a compound comprising at least two α,β-ethylenically unsaturated groups.

24. The two-component filler of claim 23 wherein the α,β-ethylenically unsaturated groups are acryloyl groups.

* * * * *

UNITED STATES PATENT AND TRADEMARK OFFICE
CERTIFICATE OF CORRECTION

PATENT NO. : 5,852,094
DATED : December 22, 1998
INVENTOR(S) : Noomen, A., et al.

It is certified that error appears in the above-indentified patent and that said Letters Patent is hereby corrected as shown below:

Claim 8, column 6, line 26 please add <u>diazabicycloundecene</u>, before diazabicyclononene.

Signed and Sealed this

Twenty-fifth Day of May, 1999

Attest:

Q. TODD DICKINSON

*Attesting Officer*     *Acting Commissioner of Patents and Trademarks*